United States Patent
Thomas

(10) Patent No.: US 12,057,696 B2
(45) Date of Patent: Aug. 6, 2024

(54) RECREATIONAL VEHICLE POWER MONITORING AND REPORTING DEVICE AND METHOD

(71) Applicant: Hughes Autoformers LLC, Anaheim, CA (US)

(72) Inventor: Patrick Allan Thomas, Yorba Linda, CA (US)

(73) Assignee: Hughes Autoformers LLC, Anaheim, CA (US)

( * ) Notice: Subject to any disclaimer, the term of this patent is extended or adjusted under 35 U.S.C. 154(b) by 0 days.

(21) Appl. No.: 17/326,190

(22) Filed: May 20, 2021

(65) Prior Publication Data

US 2021/0273447 A1    Sep. 2, 2021

Related U.S. Application Data

(63) Continuation-in-part of application No. 16/299,144, filed on Mar. 12, 2019, now Pat. No. 11,128,934.

(60) Provisional application No. 62/641,150, filed on Mar. 9, 2018.

(51) Int. Cl.
| | |
|---|---|
| *B60R 16/03* | (2006.01) |
| *B60P 3/36* | (2006.01) |
| *B60R 16/033* | (2006.01) |
| *H02H 1/00* | (2006.01) |
| *H02H 9/04* | (2006.01) |

(52) U.S. Cl.
CPC .............. *H02H 9/04* (2013.01); *B60P 3/36* (2013.01); *B60R 16/03* (2013.01); *H02H 1/0007* (2013.01)

(58) Field of Classification Search
None
See application file for complete search history.

(56) References Cited

U.S. PATENT DOCUMENTS

| | | | | |
|---|---|---|---|---|
| 5,555,483 A | * | 9/1996 | Pressman ............... | H02H 3/207 340/661 |
| 2010/0023286 A1 | * | 1/2010 | Rodseth ................. | H02H 3/046 702/65 |
| 2011/0202418 A1 | * | 8/2011 | Kempton ........... | G06Q 30/0601 705/26.1 |
| 2013/0197748 A1 | * | 8/2013 | Whitaker ................ | B60L 53/14 701/34.4 |

OTHER PUBLICATIONS

Hughes, Product User's Guide Hughes Autoformers Maintain The Power (Year: 2015).*
Hoe et al. High Voltage Power Conditioning using a Fuse Opening Switch (Year: 2005).*

* cited by examiner

*Primary Examiner* — Curtis A Kuntz
*Assistant Examiner* — Jerold B Murphy
(74) *Attorney, Agent, or Firm* — Price Heneveld LLP

(57) ABSTRACT

A recreational vehicle power monitoring and reporting device. The device includes a power input connection, a power output connection, a power conditioner module, and a power monitoring module. The power conditioner module includes a surge protector and the power monitoring module includes on or more sensors. The power condition module is removeable, replaceable, and independent of the power monitoring module.

18 Claims, 10 Drawing Sheets

RECREATIONAL VEHICLE POWER MONITORING AND REPORTING DEVICE AND METHOD

CROSS-REFERENCE TO RELATED APPLICATIONS

This application claims priority to U.S. patent application Ser. No. 16/299,144, filed Mar. 12, 2019, entitled "RECREATIONAL VEHICLE POWER MONITOR AND REPORTING DEVICE AND METHOD," now U.S. Pat. No. 11,128,934, which claims priority to U.S. Provisional Application No. 62/641,150, filed Mar. 9, 2018, the entirety of which are hereby incorporated by reference as set forth herein in their entirety.

BACKGROUND

The present disclosure relates to the field of power monitoring and/or power condition devices for recreational vehicles.

Most recreational vehicles (RVs) have the capability to hook up to an external power supply ("shore power") in order to supply electrical power to the RV. RV parks typically provide such power via electrical hookups disposed at power pedestals adjacent the RV's parking space. However, RV parks are notorious for having low-quality power supplies, often providing power at exceedingly high or low voltage levels and tending to have power spikes and surges. Such power supply problems can cause damage to electrical devices ranging from causing premature wear to the devices to overloading and causing catastrophic failure of device controls.

As such, wise RV owners will hook up their RVs to such power pedestals using power conditioning apparatus interposed between the RV's electrical system and the RV park's power pedestal. Such power conditioning apparatus can include, for example, surge protectors and/or autoformers.

However, even though RV owners can employ apparatus to protect their RVs, it can be inconvenient or impossible to check the status of power being delivered to the RV, or to know what is or has happened to such power. This is especially true when the RV user is remote from the RV.

To provide a better solution to a long-standing traditional problem, what is needed is a solution which uses power conditioning to protect a user's RV from problems with shore power and a device to communicate information about the power delivery to the RV user in a convenient and user friendly manner.

SUMMARY

To minimize the limitations in the cited references, and to minimize other limitations that will become apparent upon reading and understanding the present specification, the present specification discloses a method and device for vehicle power monitoring and reporting.

In accordance with one embodiment, the present specification provides a recreational vehicle power monitoring and reporting device. The device includes a power input connection, a power output connection, a power conditioner module, and a power monitoring module. The power conditioner module includes a surge protector and the power monitoring module includes on or more sensors. The power condition module is removeable, replaceable, and independent of the power monitoring module.

In accordance with another embodiment, the present specification provides a method for monitoring and reporting recreational vehicle power. The method includes generating a plurality of electrical information via one or more sensors monitoring at least one of a power input connection and a power output connection. The method further includes generating power data based on the plurality of electrical information and sending said power data to a user device.

Other features and advantages will become apparent to those skilled in the art from the following detailed description and its accompanying drawings.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF THE ILLUSTRATIVE EMBODIMENTS

Figure 1:
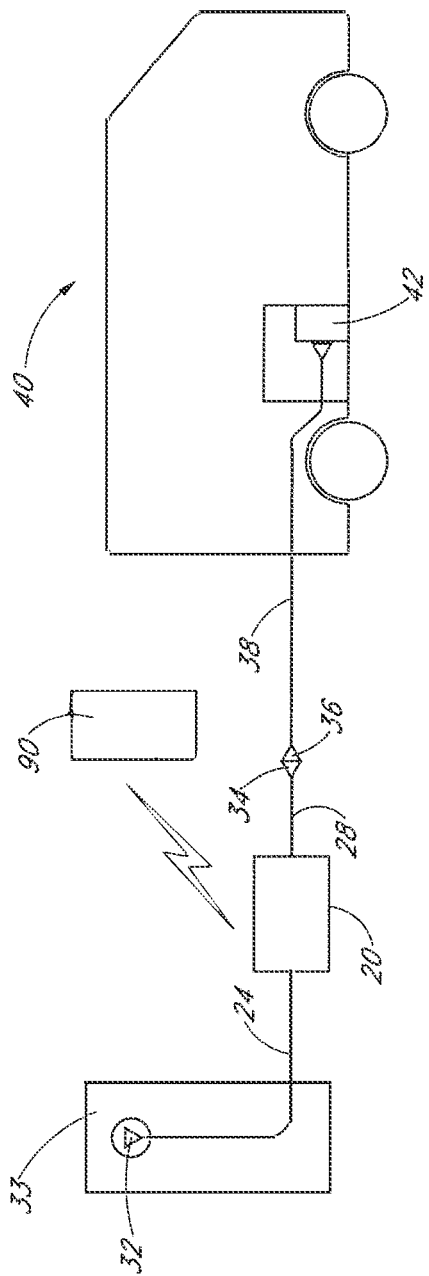
FIG. 1 illustrates a block diagram of an exemplary environment for a recreational vehicle power monitoring and reporting device, consistent with some embodiments of the disclosure.

In the following detailed description of various embodiments, numerous specific details are set forth in order to provide a thorough understanding of various aspects of the embodiments. However, the embodiments may be practiced without some or all of these specific details. In other instances, well-known procedures and/or components have not been described in detail so as not to unnecessarily obscure aspects of the embodiments.

While some embodiments are disclosed here, other embodiments will become obvious to those skilled in the art as a result of the following detailed description. These embodiments are capable of modifications of various obvious aspects, all without departing from the spirit and scope of protection. The Figures, and their detailed descriptions, are to be regarded as illustrative in nature and not restrictive. Also, the reference or non-reference to a particular embodiment shall not be interpreted to limit the scope of protection.

In the following description, certain terminology is used to describe certain features of one or more embodiments. For purposes of the specification, unless otherwise specified, the term "substantially" refers to the complete or nearly complete extent or degree of an action, characteristic, property, state, structure, item, group of items, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, group of items, or result. In another example, substantially all of a group of items, may include all of the items of that group, or at least all of the items of that group that re generally within the normal parameters for the items. To the extent that the group of items might include members that far exceed the normal parameters, this abnormal item might not be expected to be part of substantially all the group of items.

As used herein, the terms "approximately" and "about" generally refer to a deviance of within 5% of the indicated number or range of numbers. In one embodiment, the term "approximately" and "about", may refer to a deviance of between 0.0001-10% from the indicated number or range of numbers.

The drawings show illustrative embodiments, but do not depict all embodiments. Other embodiments may be used in addition to or instead of the illustrative embodiments. Details that may be apparent or unnecessary may be omitted for the purpose of saving space or for more effective illustrations. Some embodiments may be practiced with additional components or steps and/or without some or all components or steps provided in the illustrations. When different drawings contain the same numeral, that numeral refers to the same or similar components or steps.

FIG. 1 illustrates a block diagram of an exemplary environment for a recreational vehicle power monitoring and reporting device 20, consistent with some embodiments of the disclosure. Exemplary environment may include a power supply 33 ("shore power"). an input wire 34 comprising an input wire plug 32 adapted to be plugged into power supply 33, a recreational vehicle power monitoring and reporting device 20, an output wire 28 comprising an output wire plug 34 adapted to be plugged into recreational vehicle input plug 36, recreational vehicle power wire 38 adapted to be connected to recreational vehicle input plug 36, and recreational vehicle 40, comprising recreational vehicle transfer switch box 42 adapted to be connected to recreational vehicle power wire 38. Recreational vehicle power monitoring and reporting device 20 may further be connected to user device 90.

In some embodiments, the connection between recreational vehicle power monitoring and reporting device 20 and user device 90 may comprise a remote connection such that reporting device 20 may send information to user device 90 wirelessly.

Power supplies such as power supply 33 may be inconsistent and of a low-quality. Such low-quality power supplies may have a negative effect on aspects of the recreational vehicle 40 electrical system. Accordingly, in some embodiments, recreational vehicle power monitoring and reporting device 20 may enable real time monitoring of power performance data and may also provide notifications to user device 90 when aspects of the power supply 33 fall out of acceptable ranges. As such, a user associated with user device 90 may be alerted to address power supply problems before damage is done to the recreational vehicle's 40 electrical system.

Figure 2:
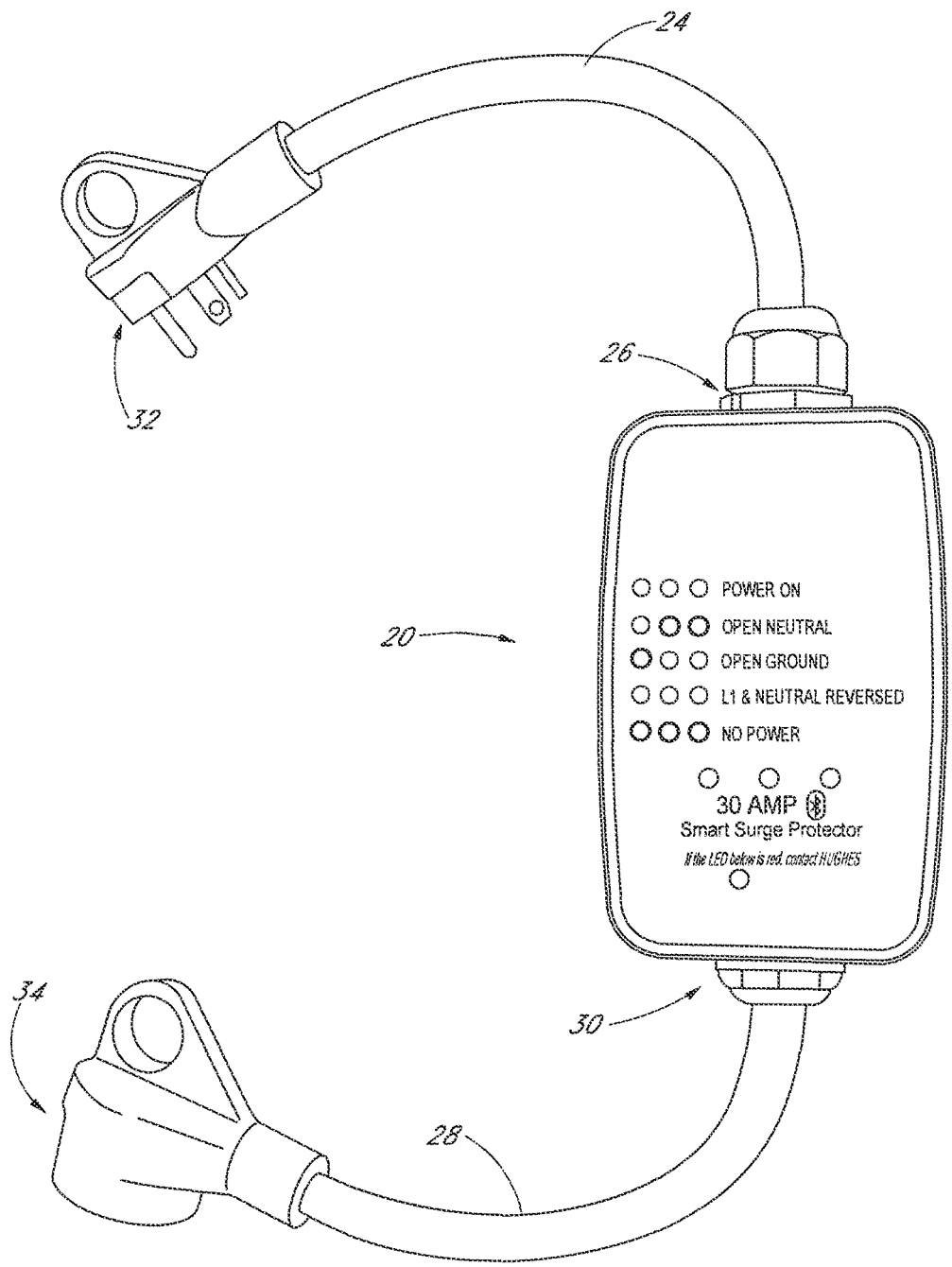
FIG. 2 shows an exemplary recreational vehicle power monitoring and reporting device, consistent with some embodiments of the disclosure.

FIG. 2 shows an exemplary recreational vehicle power monitoring and reporting device 20, consistent with some embodiments of the disclosure. Exemplary recreational vehicle power monitoring and reporting device 20, may include an input end 26 and an output end 30. Input end 26 of recreational vehicle power monitoring and reporting device 20 may be connected to input wire 24. Input wire 24 may comprise input wire plug 32 at the end of input wire 24. Input wire plug 32 may be adapted to be plugged into an external power supply such as power supply 33. Output end 30 of recreational vehicle power monitoring and reporting device 20 may be connected to output wire 28. Output wire 28 may comprise output wire plug 34 at the end of output wire 28. Output wire plug 34 may be adapted to be plugged into a recreational vehicle input plug such as recreational vehicle input plug 36.

It will be appreciated that input wire plug 32 and output wire plug 34 may comprise many different electrical connection types and should not be limited to a single connection type as may be displayed in FIG. 2.

In some embodiments, each of input end 26 and output end 30 may comprise one or more cable glands adapted to unscrew to loosen and allow recreational vehicle monitoring and reporting device 20 to be opened. It will be appreciated that other types of connectors besides cable glands may be used such that the connector may be loosened allowing the recreational vehicle monitoring and reporting device 20 to be opened.

In some embodiments, where each of input end 26 and output end 30 comprise one or more cable glands, recreational vehicle power monitoring and reporting device 20 may be adapted to be opened so that one or both of power conditioner module 50 and power monitoring module 60 may be replaced. For example, power conditioner module 50 may be adapted to be disconnected from electrical connectors 53 and 55 and from the recreational vehicle power monitoring and reporting device 20. Power conditioner module 50 may therefore be replaced without affecting the rest of the recreational vehicle power monitoring and reporting device 20.

Figure 3:
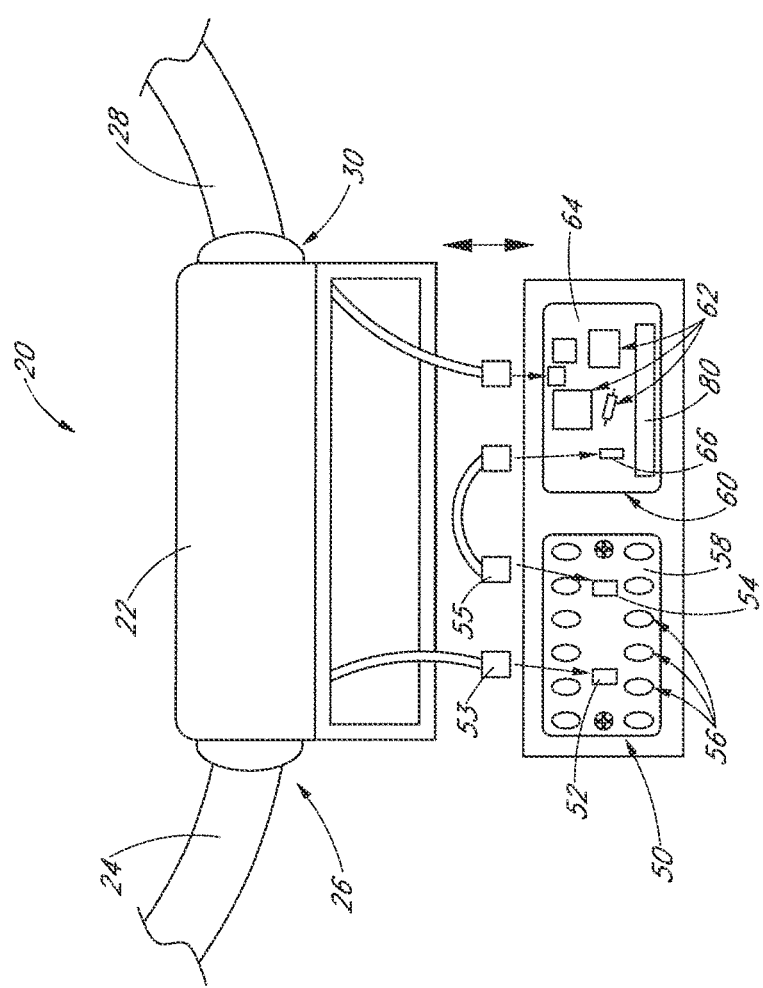
FIG. 3 shows a partially disassembled view of an exemplary recreational vehicle power monitoring and reporting device, consistent with embodiments of the disclosure.

FIG. 3 shows a partially disassembled view of a recreational vehicle power monitoring and reporting device 20 such as the recreational vehicle power monitoring and reporting device 20 of FIG. 2, consistent with embodiments of the disclosure. Recreational vehicle power monitoring and reporting device 20 may comprise a housing 22, electrical connectors 53 and 55, a power conditioner module 50, and a power monitoring module 60. Power conditioner module 50 may comprise a first connector 52, an output connector 54, electrical components 56, and a printed circuit board 58. Power monitoring module 60 may comprise electrical components 62, a printed circuit board 64, an input connector 66, and wireless communication module 80.

In some embodiments, the power conditioner module 50 may further comprise a surge protector adapted to condition the power received from a power supply such as power supply 33 of FIG. 1. The power conditioner module 50 may, for example, may protect electrical devices downstream of power conditioner module 50, such as electrical devices connected either directed or indirectly to output wire 28 from power surges, voltage spikes, and other potentially damaging electrical events.

In some embodiments, power conditioner module 50 may be replaceable independent of power monitoring module 60 to enable replacement of a worn-out surge protector without disturbing power monitoring module 60. For example, since the power conditioner module electrical components 56 may be mounted on a different printed circuit board 58 than printed circuit board 64 of power monitoring module 60, the housing 22 may be accessed, electrical connectors 53 and 55 that electrically connect the power conditioning module 50 to the power monitoring module 60 may be detached, and power conditioner module 50 may be removed, and replaced with a new power conditioner module. In some embodiments, when a surge protector is worn out, power monitoring module 60 may generate a notification that it is time to replace the power conditioner module 50.

In some embodiments, the power monitoring module 60 may be adapted to determine energy parameters relating to the incoming and outgoing power. For example, the power monitoring module 60 may be adapted to determine whether current is flowing through one or more output lines such as output wire 28 from the power monitoring module 60. The power monitoring module 60 may also be adapted to determine the status of ground structures, such as whether a proper ground has been established. The power monitoring module 60 may also be adapted to determine various electricity flow parameters such as input and output voltage, input and output current, and input and output power. Notwithstanding the foregoing, the power monitoring module 60 may also be adapted to determine various other voltage, currents, and power measurements.

In some embodiments, power monitoring module 60 may comprise electronic components 62 including sensors, processor(s), memory, and other electronic components, which, may be attached, mounted, or contained on printed circuit board 64. Printed circuit board 64 may be a separate printed circuit board from printed circuit board 58. Input connector 66 of the power monitoring module 60, therefore, may be adapted to be releasably attached to the second connector 54 of the power conditioner 50 so that conditioned power may flows to power monitoring module 60.

In some embodiments the electronic components 62 may further comprise a processor adapted to perform analysis/calculations on sensor readings and send the results to memory and a memory adapted to receive the results from the processor and save measurements and/or results to the memory. In some embodiments, therefore, the power monitoring module 60 can sense, calculate, track, and save various electric parameters such as current, power, voltage, and/or energy used in a current session, over a predetermined period of time, and in total. It will be understood that there may be other measurements related to the recreational vehicle power monitoring and reporting device 20 that may be sensed, calculated, tracked, and saved.

In some embodiments, wireless communication module 80 may include a processor, transmitter, and receiver adapted to allow wireless communication module 80 to receive, transmit, and process wireless signals. Wireless communication module 80 may also comprise or interface with an antenna structure comprising one or more antennae that may be mounted within or part of housing 22. The antenna structure may alternatively be mounted within or in conjunction with one or more of the input and output wires 24 and 28. In some embodiments, the wireless communication module 80 may allow for Bluetooth, Wi-Fi, cellular, radio protocols, and all other wireless methods of communication.

In some embodiments the power monitoring module 60 may communicate with wireless communication module 80 so that the various electrical parameters may be wirelessly communicated to a user device such as user device 90 of FIG. 1. Wireless communication module 80 may be mounted on and supported by power monitoring module 60. Alternatively, wireless communication module 80 may be mounted within housing 22 on a separate printed circuit board. In some embodiments, power conditioner module 50 may also communicate with wireless communication module 80 so that various electrical parameters may be wireless communicated to a user device such as user device 90 of FIG. 1. For example, power conditioner module 50 may communicate the status of surge protectors associated with power conditioner module 50 to wireless communication module 80 and wireless communication module 80 may then communicate the status to a user device such as user device 90 of FIG. 1.

Figure 4:
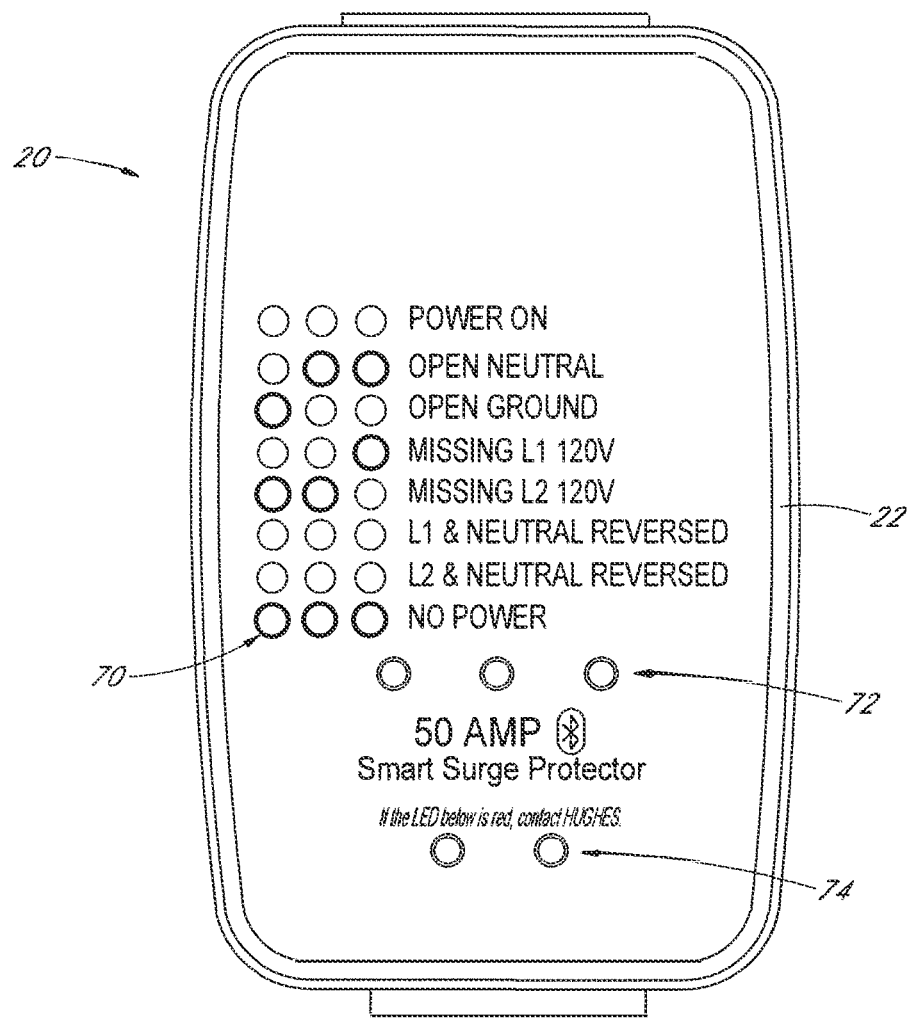
FIG. 4 shows an exemplary recreational vehicle power monitoring and reporting device, according to some embodiments of the disclosure.

FIG. 4 shows a recreational vehicle power monitoring and reporting device 20, according to some embodiments of the disclosure. Recreational vehicle power monitoring and reporting device 20 may comprise housing 22, display 70, and one or more arrays of light emitting diodes (LEDs) 72 and 74.

In some embodiments, a power monitoring module such as power monitoring module 60 of FIG. 3 may include one or more arrays of LEDs 72, aligned to be visible through housing 22. Power monitoring module 60 may control LEDs 72 and use LEDs 72 to indicate information regarding the condition of power delivery. In some embodiments, display 70 may comprise meanings associated with the information displayed by LEDs 72.

In some embodiments, a power conditioner module such as power conditioner module 50 may include one or more arrays of LEDs 74 adapted to be visible through housing 22. In some embodiments, display 70 may comprise meanings associated with the information displayed by LEDs 74. In some embodiments, power conditioner 50 may be a surge protector. As surge protectors may become less effective when subjected to electrical surges while protecting downstream electrical equipment, they may eventually wear out. Power conditioner module 50 may include circuitry that senses parameters and conditions relating to the surge protector electronics and may therefore determine when a surge protector should be replaced. Upon such a determination, one or more of LEDs 74 may be lit, signaling that it is time to replace one or more surge protectors.

Figure 5:
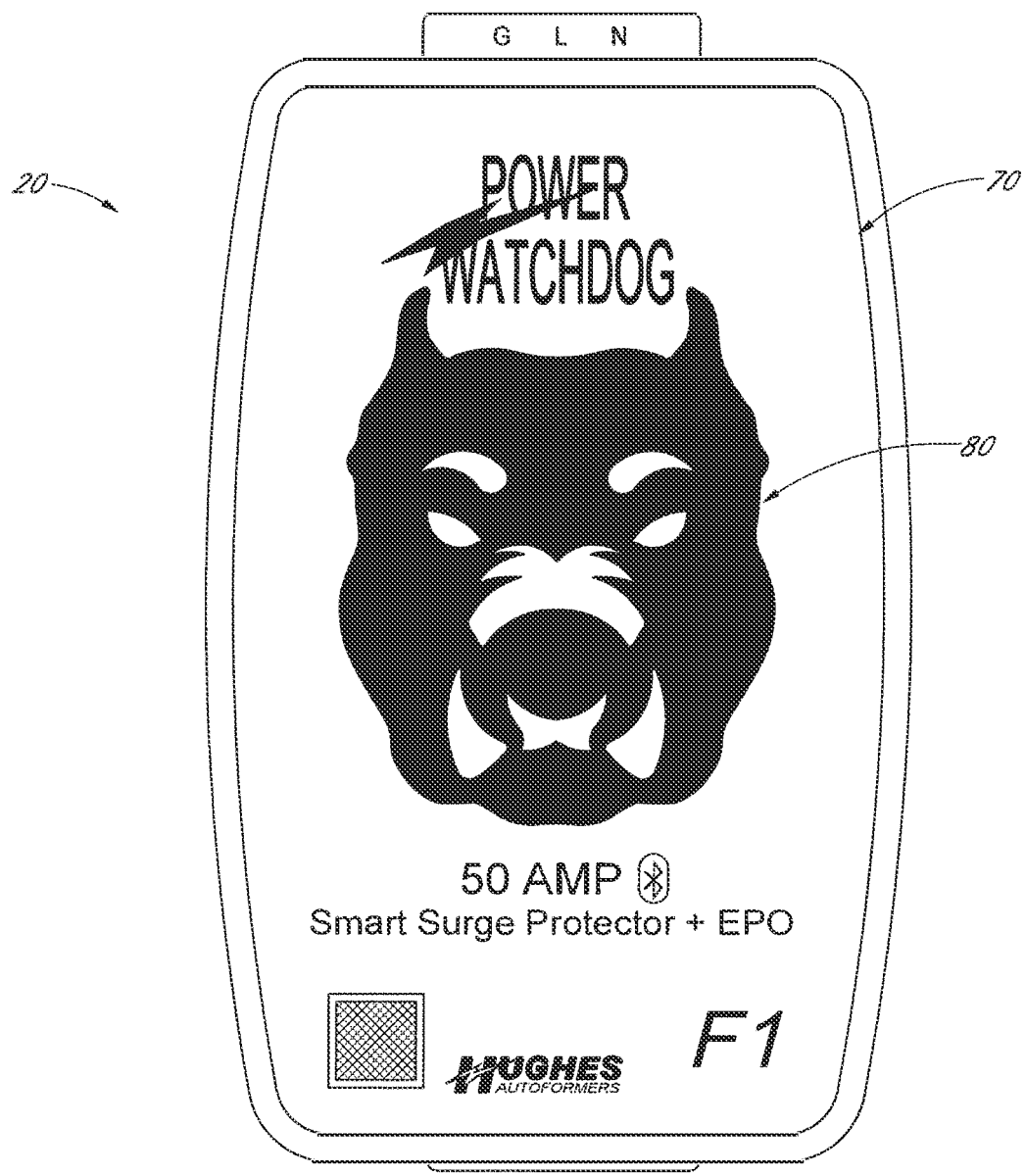
FIG. 5 shows another exemplary recreational vehicle power monitoring and reporting device, according to some embodiments of the disclosure.

FIG. 5 shows a recreational vehicle power monitoring and reporting device 20, according to some embodiments of the disclosure. Recreational vehicle power monitoring and reporting device 20 may comprise display 70 and graphic 82.

In some embodiments, recreational vehicle power monitoring and reporting device 20 may comprise display 70 such as an LCD display. Display 70 may be controlled by power monitoring module 60 and adapted to display codes indicating power conditions. One or more indicator LEDs may be adapted to be lit if power monitoring module 60 detects a problem concerning a power supply such as power supply 33. For example, an indicator LED may glow red when a power supply does not have a neutral electrical connection.

In some embodiments, one or more LEDs may be configured to light graphic 82. Graphic 82 may be configured as a lens that may glow when the associated LEDs are lit. When a power supply such as power supply 33 is connected and operating properly, power monitoring module 60 may control LEDs to glow white. A white glow may therefore indicate a properly operating power supply.

In some embodiments, the white glow may be configured to light up a power panel associated with a power supply such as power supply 33 and the surrounding area, providing a quick and easy way to check power status remotely and also providing a night light to discourage prowlers or thieves. When power monitoring module 60 determines that there may be a power problem, the power monitoring module 60 may control LEDs to glow a different color, such as red. This may provide an indicator to a user, prompting the user to take a closer look at the power performance.

Figure 6:
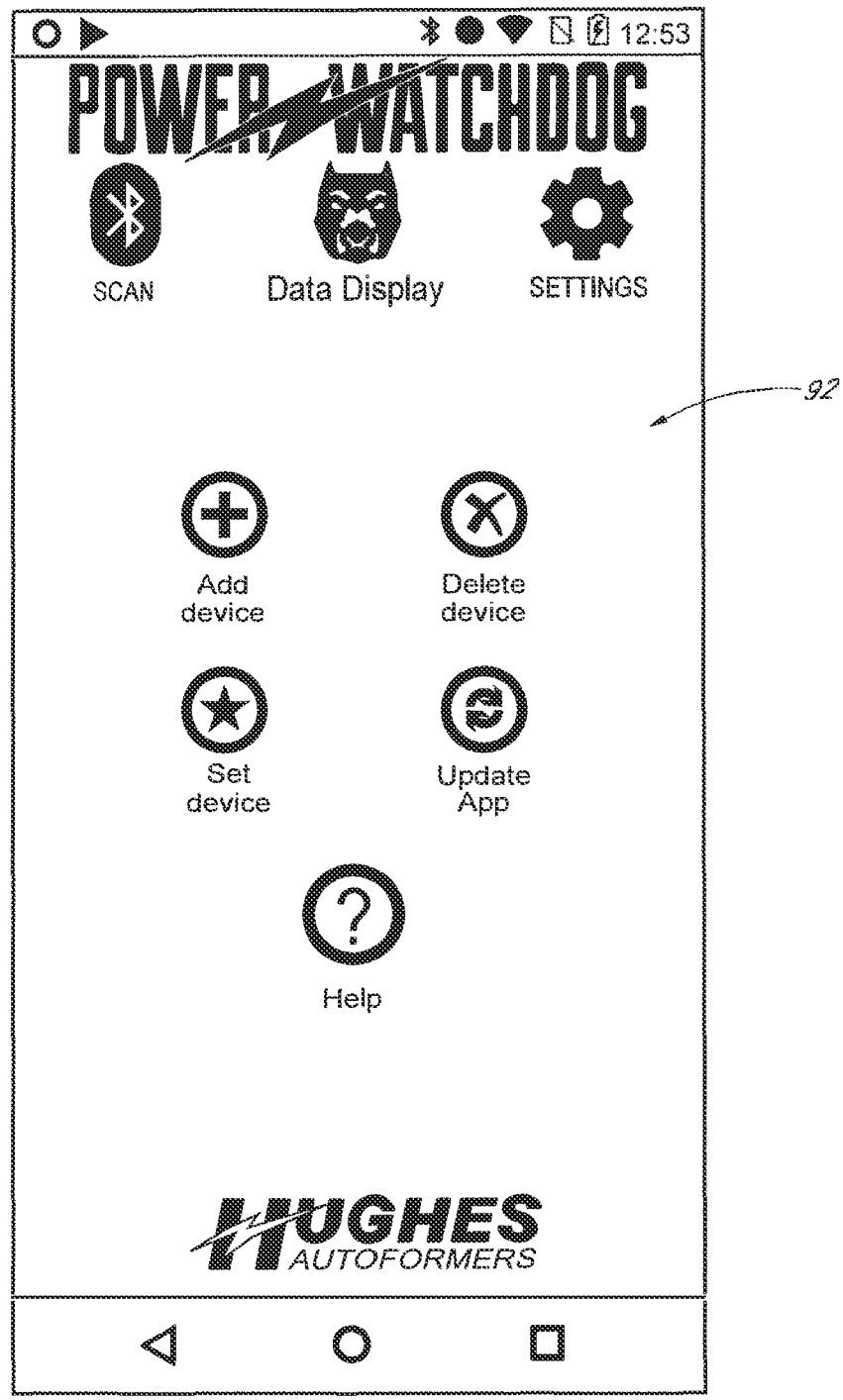
FIGS. 6-9 show multiple exemplary screens of a user device associated with recreational vehicle power monitoring and reporting device, according to some embodiments of the disclosure.

FIGS. 6-9 show multiple screens of a user device associated with recreational vehicle power monitoring and reporting device 20, according to some embodiments of the disclosure. FIG. 6 shows a screen 92 associated with a user device, such as user device 90. User device 90 may be associated with a recreational vehicle power monitoring and reporting device 20 such that user device 90 may send and receive electrical performance and related data from recreational vehicle power monitoring and reporting device 20.

In some embodiments, wireless communication module 80 may comprise a Bluetooth communications module. A user device such as user device 90 of FIG. 1 may be adapted to receive and send Bluetooth communications and recreational vehicle power monitoring and reporting device 20 may therefore communicate electrical performance data to user device 90 via wireless communication module 80. In some embodiments, user device 90 may comprise a smartphone, and electric parameters may be displayed on screen 92. In some embodiments, the display features provided on display 70 of power monitoring device housing 22 may be communicated to and displayed by user device 90. For example, in some embodiments, screen 92 may be adapted to display power status, the status of an open neutral, the status of an open ground, the status of a missing L1 120V line, the status of a missing L2 120V line, and the status of no power. In some embodiments, screen 92 may also be adapted to display the status of a surge protector associated with a power conditioner module such as power conditioner module 50.

Figure 7:
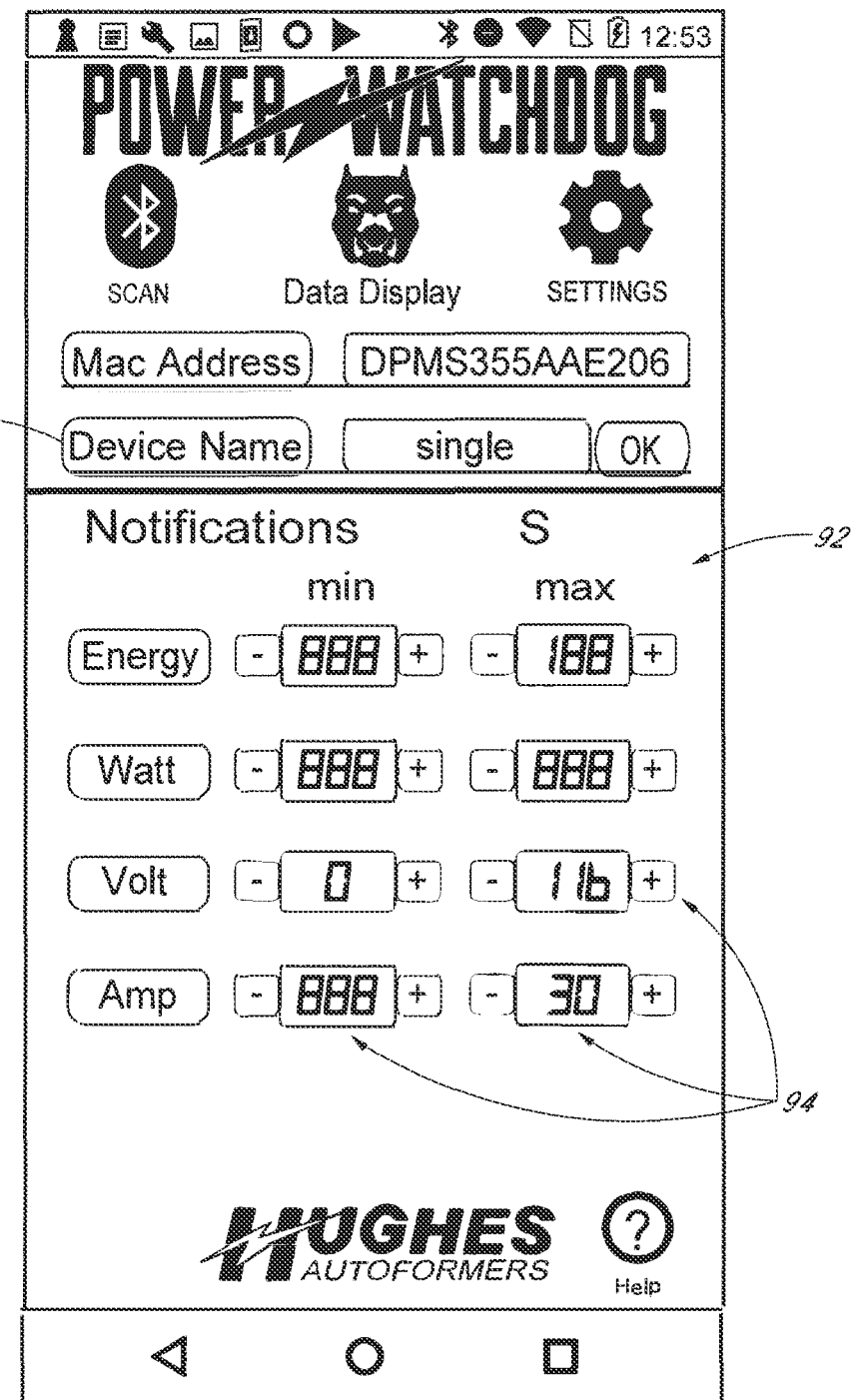
Figure 8:
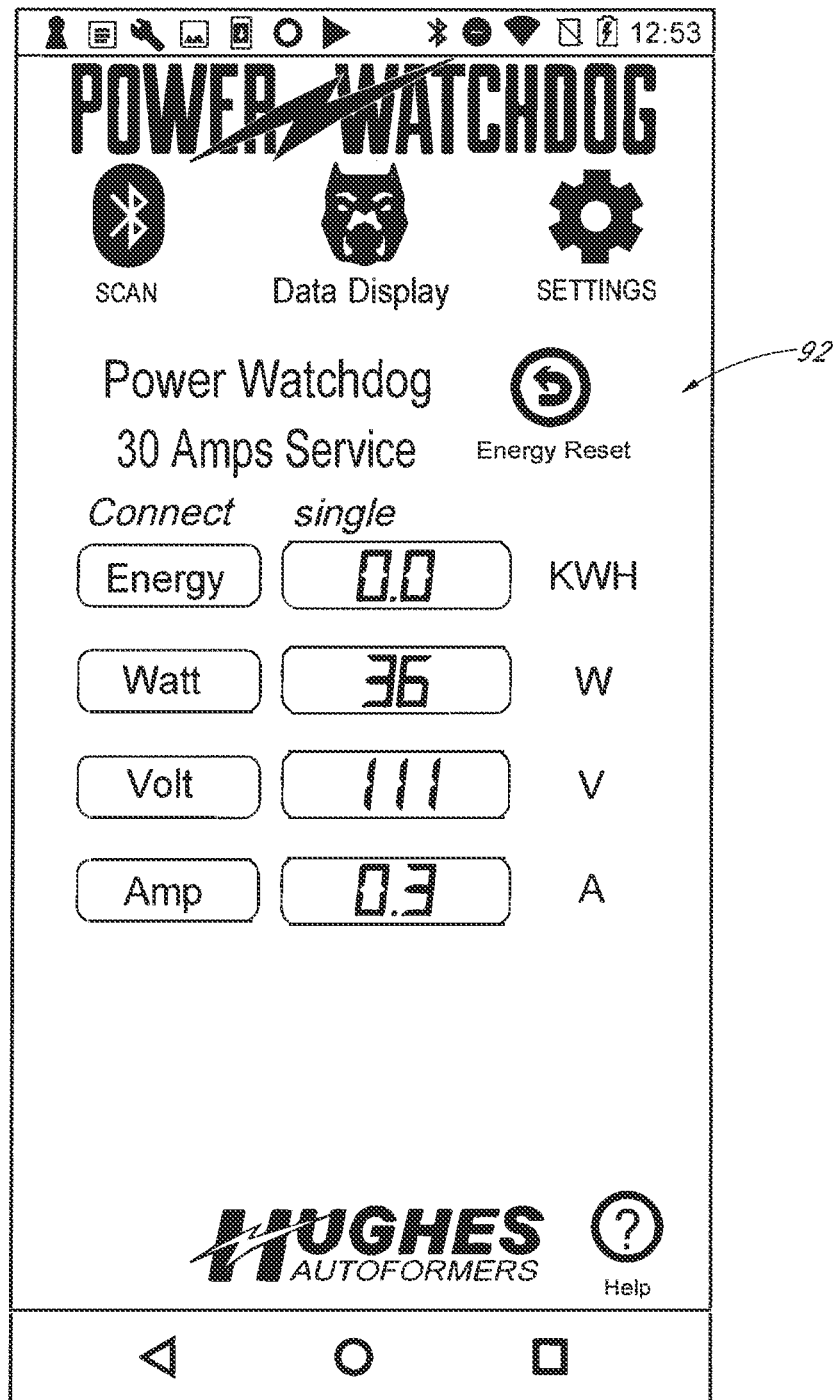
Figure 9:
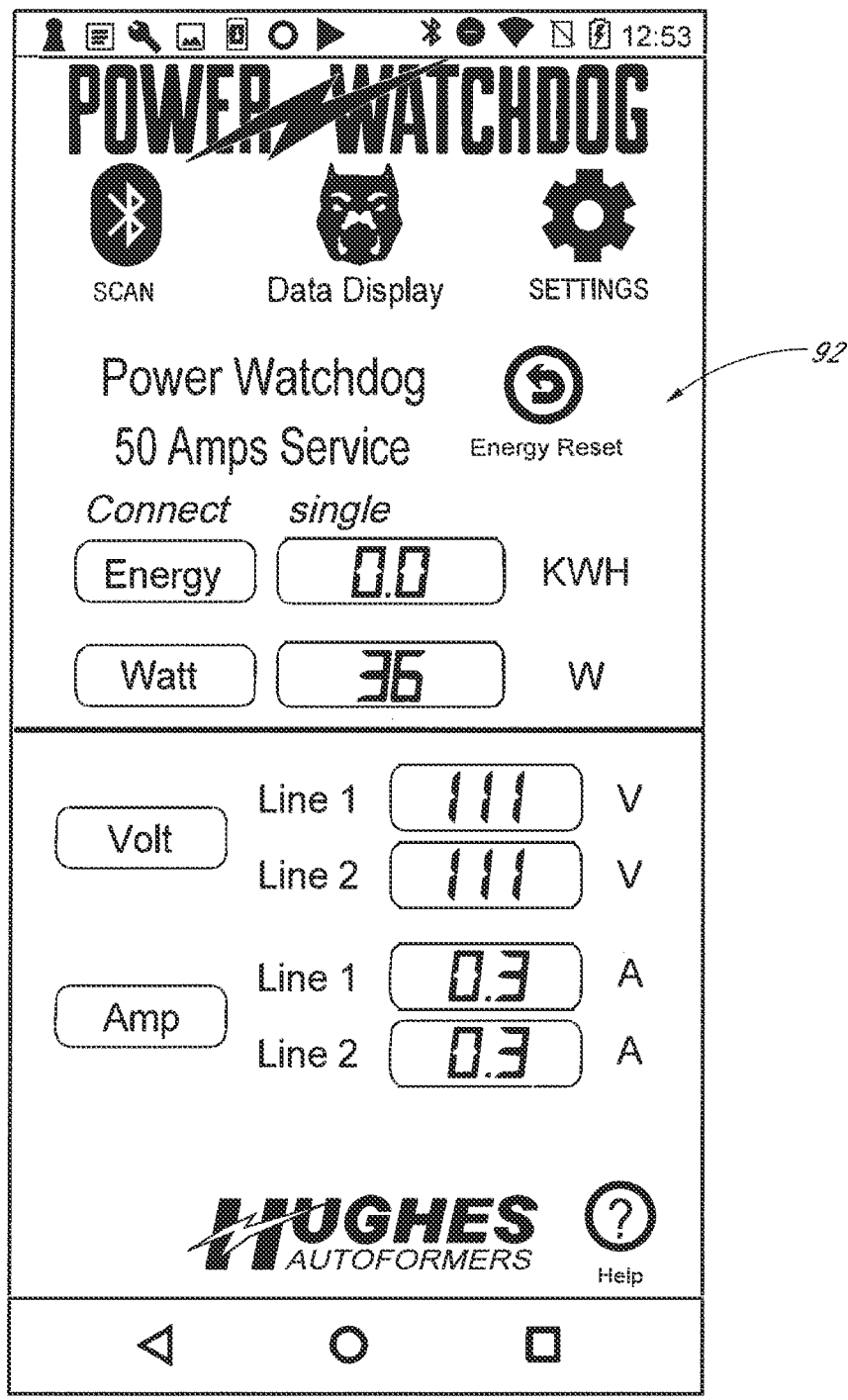

In some embodiments, user device 90 may conventionally paired with recreational vehicle power monitoring and reporting device 20 via Bluetooth. As shown in FIG. 7, user device 90 may enable selective pairing to one or more recreational vehicle power monitoring and reporting devices 20 and enable a user associated with user device 90 to assign a unique name 91 to each paired device. Recreational vehicle power monitoring and reporting device 20 may transmit electrical performance data to user device 90, enabling the user associated with user device 90 to view and monitor power parameters. Such electrical performance data may be transmitted by recreational vehicle power monitoring and reporting device 20 automatically in real time, periodically, or upon a request from user device 90. As shown in FIGS. 8-9, power parameters such as voltage and current associated with a power line, power supplied, and overall energy supplied may be displayed.

It will be appreciated that more or less power information may be supplied as necessary or desired for a given situation. In some embodiments, user device 90 may be able to access historical data associated with recreational vehicle power monitoring and reporting device 20 and may calculate and display comparisons of current, real time power parameters as well as historical power data.

As shown in FIG. 7, user device 90 may receive input causing user device 90 to set ranges of acceptable parameters for particular aspects of power. In some embodiments, user device 90 may comprise input boxes 94 for a user associated with user device 90 to enter acceptable minimum and maximum threshold values for the aspects of power such as energy, power flow, voltage and current. These minimum and maximum threshold values may be measured and set for a given period of time.

In some embodiments, as shown in FIG. 7, if there is no set minimum or maximum setting for a particular aspect power, user device 90 may not make any determination about whether that particular aspect falls out of any range. For example, not all input boxes 94 require an associated input. Similarly, a user associated with user device 90 may provide data for both minimum and maximum value, for only one or minimum and maximum value, or for neither minimum nor maximum value. In some embodiments, user device 90 may have a given default value that may be used as the minimum or maximum value unless and until changed.

In some embodiments, when the particular power aspect falls out of the set ranges, a notification may be displayed on user device 90. It will be appreciated that such a notification may comprise various forms, such as an aural or vibrating alarm via notification programming associated with user device 90. The notification may also come in other forms, such as an email or text message associated with user device 90. A user associated with user device 90 may then be notified of the power supply problem and may take corrective action as appropriate. In some embodiments, the user may be notified through the user device 90 that a dangerous power condition may exist in the recreational vehicle power monitoring and reporting device, vehicle, or power source.

As shown in FIG. 8, information relating to power may be displayed on the user device 90. In some embodiments, the information relating to power may be stored on the user device 90 and retrieved at a later time. In some embodiments, the information relating to power may allow the user to review a history of power conditions, including alerts generated as a result of bad power conditions. In some embodiments, the information may be displayed in the form of a graph over time. In some embodiments, this functionality may be used to monitor how much power the user has used at any particular location or campground. This information may be compiled from multiple users to create a database that identifies the type of power offered by recreational vehicle parks. The recreational vehicle park managers may also have access to this database and may use this information to improve the operation of the recreational vehicle park.

In some embodiments, user device 90 may monitor power in real time. For example, as shown in FIG. 9, the electric power characteristics of both lines are monitored. Various electrical devices and appliances associated with recreational vehicle 40 may draw vastly different loads, since it is preferable to maintain constant power delivery across lines. Therefore, a user associated with user device 90 may use user device 90 to arrange the electrical load of the various electrical devices and appliances associated with recreational vehicle 40 such that load balance is maintained between the power delivery lines. In some embodiments, the user device 90 may record and/or display information related to specific power consumed by particular appliances, and record their history.

In some embodiments, recreational vehicle power monitoring and reporting device 20 may be adapted to measure the balance and imbalance of electrical loads in a split phase circuit. Recreational vehicle power monitoring and reporting device 20 may be further adapted to send a message to user device 90 corresponding with the measurement of the balance and/or imbalance of the loads. For example, if the loads are imbalanced and there is therefore potential danger to the circuitry, recreational vehicle power monitoring and reporting device 20 may send a notification to user device 90 allowing user device 90 to alert an associated user of the dangerous electrical condition. As another example, recreational vehicle power monitoring and reporting device 20 may shut off the connection to power supply 33 when there is a load imbalance and send a notification that the connection has been cut to user device 90.

It will be appreciated that various additional aspects and power performance issues may be monitored. For example, in some embodiments, a recreational vehicle power monitoring and reporting device 20 may be adapted to automatically cut off power supply to recreational vehicle 40 if it is determined that the power supply, such as power supply 33 is of such low quality that damage to the recreational vehicle's 40 electrical system is imminent. Recreational vehicle power monitoring and reporting device 20 may send a notification to user device 90 to inform a user associated with user device 90 that the power supply 33 has been cut off. The notification may include data concerning the power status and indicating one or more reasons why power was cut off. It will be appreciated that user device 90 may be configured to allow a user associated with user device 90 to select and set the criteria for cutting off power supply 33. For example, a user may set a minimum voltage setting of 102V and a maximum voltage setting of 132V. In response, recreational vehicle power monitoring and reporting device 20 may then shut off power if the detected voltage falls below the 102V or above 132V and will subsequently send a notification to user device 90 indicating that power and been cut off and the threshold that was breached causing the cut off.

In some embodiments, recreational vehicle power monitoring and reporting device 20 may send one or more notifications to user device 90 for maintenance issues. For example, if recreational vehicle power monitoring and reporting device 20 determines that a surge protector associated with power conditioner module 50 is nearly worn out, recreational vehicle power monitoring and reporting device 20 may generate a notification to user device 90 to indicate a need to replace power conditioner module 50.

In some environments, the user device 90 may send a command to the recreational vehicle power monitoring and reporting device 20, such as connecting or disconnecting the recreational vehicle power monitoring and reporting device 20 from an external power source. One benefit of this functionality is that and attached recreational vehicle may be turned on prior to picking up from storage, or activating electronics such as air conditioning or refrigeration So that things are ready when the user arrives at the vehicle.

In some embodiments, wireless communication module 80 may notify user device 90 when an autoformer switches between configurations and may generally provide autoformer status. Further the power monitoring module 60 may communicate with a control circuit of the autoformer to determine input power and provide such data to user device 90.

In some embodiments, wireless communications module 80 may be configured to extend range from typical Bluetooth communications ranges. For example, additional structure, such as a Bluetooth router (see the Cassia Hub Bluetooth Router available from Cassia Networks) may be employed to extend wireless range. In some embodiments, wireless communications module 80 may include WiFi connection capability enabling the power monitor device to connect to WiFi networks or other WiFi supported hubs.

Figure 10:
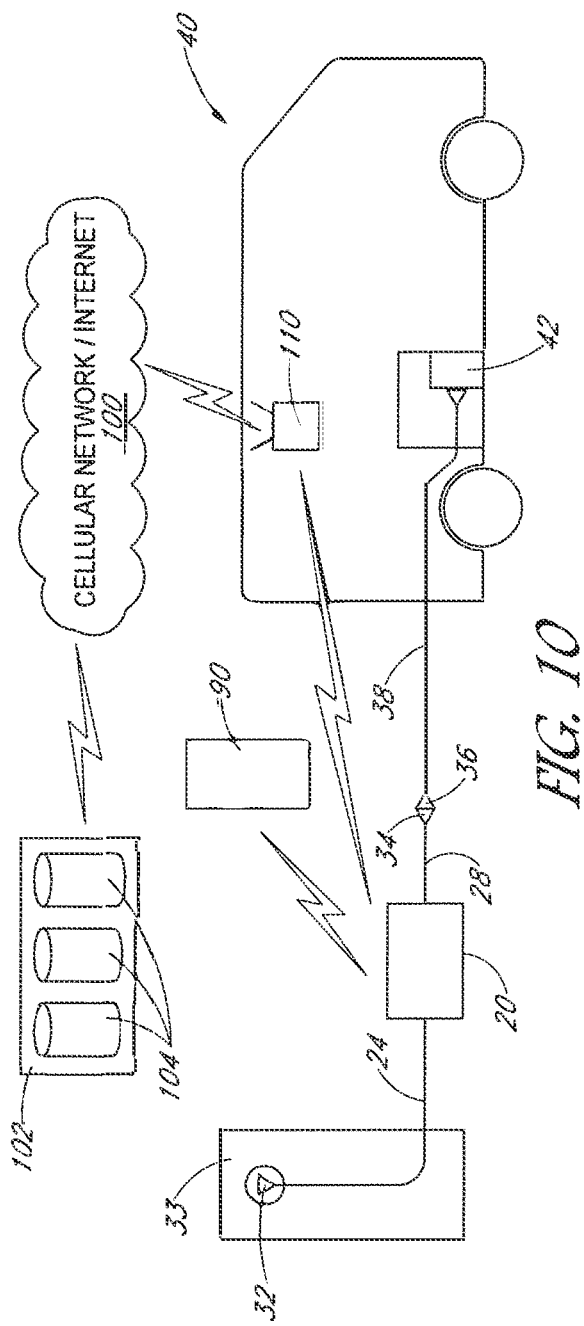
FIG. 10 illustrates a block diagram of another exemplary environment for a recreational vehicle power monitoring and reporting device, consistent with some embodiments of the disclosure.

FIG. 10 illustrates a block diagram of another exemplary environment for a recreational vehicle power monitoring and reporting device 20, consistent with some embodiments of the disclosure. In some embodiments, recreational vehicle power monitoring and reporting device 20 may be adapted to include a cellular communications module, such as wireless communications module 80. Wireless communications module 80 may be adapted to connect to a cellular network such as cellular network 100. Alternatively or additionally, wireless communications module 80 may be adapted to connect to a satellite-based communications network. It will be appreciated that wireless communications module 80 may have many different methods of connecting wirelessly to a user device such as user device 90.

In some embodiments, recreational vehicle power monitoring and reporting device 20 may further comprise a cellular data card or embedded cellular gateway. The cellular data card or embedded cellular gateway may be provided within the housing 22 and adapted to enable the recreational vehicle power monitoring and reporting device 20 to connect to a cellular network, such as cellular network 100. In some embodiments, recreational vehicle power monitoring and reporting device 20 may connect to the internet through cellular network 100.

In some embodiments recreational vehicle power monitoring and reporting device 20 may further comprise cellular signal boosters within the housing 22. In some embodiments, separate structures for cellular signal boosters may be plugged in or otherwise interfaced with recreational vehicle power monitoring and reporting device 20.

In some embodiments, recreational vehicle power monitoring and reporting device 20 may communicate with user device 90 via a cellular network 100 and/or the internet rather than through Bluetooth.

In some embodiments, recreational vehicle power monitoring and reporting device 20 may be used in connection with software installed on user device 90. For example, recreational vehicle power monitoring and reporting device 20 may send notifications to user device 90 when power supply aspects fall outside acceptable ranges via text messages over the cellular network, or via email notifications from communications through the internet. User device 90 may be adapted to access a web-based service that may display detailed monitoring data for one or more recreational vehicle power monitoring and reporting devices 20. The web-based service may maintain a computer system 102 having one or more databases 104 that may store data and analysis results generated by one or more recreational vehicle power monitoring and reporting devices 20, and may also perform calculations based on the stored data and analysis results.

In some embodiments, power supply data may be stored in a memory associated with user device 90. Data storage and processing may be performed on user device 90.

In some embodiments, power supply data may be uploaded to the cloud or a host network, where the power supply data may be stored remotely from both recreational vehicle power monitoring and reporting device 20 and the linked user device 90.

In some embodiments, power data may be combined or linked with additional data. For example, recreational vehicle power monitoring and reporting device 20 may include GPS location capability, and location data may be linked to the sensed power data. In other embodiments, user device 90 may include GPS location capability and location data may be referenced and recorded when recreational vehicle power monitoring and reporting device 20 is plugged into power supply 33. Power data obtained and stored while recreational vehicle power monitoring and reporting device 20 is connected to a certain power supply 33 may be linked to the location data. Such data may be stored on user device 90, on one or more databases 104 of a remote computer network 102, or on recreational vehicle power monitoring and reporting device 20.

In some embodiments, a GPS location may be correlated to the location of a particular recreational vehicle park. recreational vehicle power monitoring and reporting device 20 may therefore keep a memory of the quality of a power supply at a given park. Such data may be associated with a time stamp indicating a time and date of use. In some embodiments, such data may be combined with data obtained from multiple recreational vehicle power monitoring and reporting devices 20 connected to the same web-based service to create a cloud-based database cataloging users' actual experience with the power supply of a particular recreational vehicle park.

Figure 11:
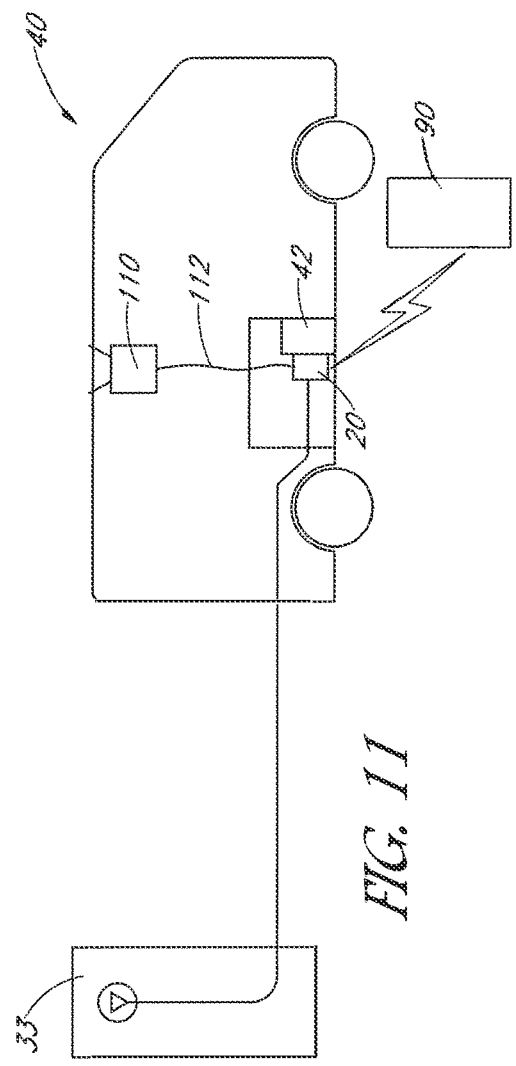
FIG. 11 illustrates a block diagram of still another exemplary environment for a recreational vehicle power monitoring and reporting device, consistent with some embodiments of the disclosure.

FIG. 11 illustrates a block diagram of still another exemplary environment for a recreational vehicle power monitoring and reporting device 20, consistent with some embodiments of the disclosure. As shown in FIG. 11, recreational vehicle power monitoring and reporting device 20 may be hard-wired to switch box 42 of the recreational vehicle 40. recreational vehicle power monitoring and reporting device 20 may wirelessly communicate with user device 90. In another embodiment, the recreational vehicle 40 may have its own dedicated wireless communication system 110, such as a Verizon® JetPack®. Recreational vehicle power monitoring and reporting device 20 may be configured to communicate wirelessly with wireless communication system 110.

In other embodiments, recreational vehicle power monitoring and reporting device 20 may communicate with wireless communication system 110 via a wire 112. In some embodiments, recreational vehicle power monitoring and reporting device 20 may communicate with user device 90 through wireless communication system 110.

In some embodiments, user device 90 may be adapted to be paired with at least some equipment of the recreational vehicle's 40 electrical system, such as through the recreational vehicle's dedicated wireless communication system 110. For example, if the power supply 33 is cut off, user device 90 may receive a notification indicating power has been shut off. User device 90 may then display devices and appliances associated with recreational vehicle's 40 electrical system that are wirelessly connected, such as an on-board generator and/or battery. User device 90 may then gauge the charge level of the battery to determine whether the battery can, for example, provide sufficient power to keep the air conditioning or refrigerator operating. User device 90 may send instructions to a generator to begin operation to charge the battery and ensure smooth operation of recreational vehicle 40 even though power supply 33 was cut off.

In some embodiments, recreational vehicle power monitoring and reporting device 20 may be adapted monitor power supply 33 even after cutting off power supply 33 due power supply problems. In some embodiments, if the power supply 33 returns to operating within set limits for a predetermined threshold period of time, recreational vehicle power monitoring and reporting device 20 may automatically restore connection to power supply 33. In other embodiments, user device 90 may be adapted to either allow or disallow such reconnection by recreational vehicle power monitoring and reporting device 20. user device 90 may be adapted to allow connection to power supply 33 to be restored, but if power supply 33 goes out of compliance within a threshold period of time so that connection to power supply 33 is cutoff again, recreational vehicle power monitoring and reporting device 20 will not attempt to restore power until specifically instructed to by user device 90.

Unless otherwise stated, all measurements, values, ratings, positions, magnitudes, sizes, locations, and other specifications that are set forth in this specification, including in the claims that follow, are approximate, not exact. They are intended to have a reasonable range that is consistent with the functions to which they relate and with what is customary in the art to which they pertain.

The foregoing description of the preferred embodiment has been presented for the purposes of illustration and description. While multiple embodiments are disclosed, still other embodiments will become apparent to those skilled in the art from the above detailed description. These embodiments are capable of modifications in various obvious aspects, all without departing from the spirit and scope of protection. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope of protection. It is intended that the scope of protection not be limited by this detailed description, but by the claims and the equivalents to the claims that are appended hereto.

Except as stated immediately above, nothing that has been stated or illustrated is intended or should be interpreted to cause a dedication of any component, step, feature, object, benefit, advantage, or equivalent, to the public, regardless of whether it is or is not recited in the claims.

What is claimed is:

1. A recreational vehicle power monitoring and reporting device, comprising:
    a power input connection;
    a power output connection;
    a wireless communication module;
    a power conditioner module; and
    a power monitoring module;
    wherein said power conditioner module comprises a surge protector;
    wherein said power monitoring module comprises one or more sensors;
    wherein said power conditioner module is removeable, replaceable, and independent of said power monitoring module;
    wherein said power monitoring module is adapted to receive a plurality of information that is gathered by said one or more sensors;

wherein said power monitoring module is further adapted to generate power data based on said plurality of information and send said power data to said wireless communication module;

wherein said wireless communication module is configured to transmit said power data to a user device;

wherein said plurality of information comprises a history of power conditions that is stored on said user device;

wherein said history of power conditions comprises a location, such that said plurality of information is compiled to create a database that identifies a type of power offered by said location.

2. The recreational vehicle power monitoring and reporting device of claim 1 wherein said power data comprises one or more of voltage measurements, current measurements, power measurements, and energy measurements.

3. The recreational vehicle power monitoring and reporting device of claim 1 wherein said power data comprises data associated with replacing said surge protector of said power conditioner module.

4. The recreational vehicle power monitoring and reporting device of claim 1 wherein said power data comprises data related to a load balance.

5. The recreational vehicle power monitoring and reporting device of claim 1 wherein said power data comprises data associated with a power condition of said power input connection.

6. The recreational vehicle power monitoring and reporting device of claim 5 wherein said data associated with said power condition of said power input is further associated with at least one of a time and a location.

7. The recreational vehicle power monitoring and reporting device of claim 1 wherein said wireless communication module is further configured to receive instructions from said user device and wherein said power input connection is adapted to be turned on and off.

8. The recreational vehicle power monitoring and reporting device of claim 7 wherein said instructions comprise instructions associated with turning off said power input connection.

9. The recreational vehicle power monitoring and reporting device of claim 7 wherein said instructions comprise instructions associated with turning on said power input connection.

10. A recreational vehicle power monitoring and reporting device, comprising:
a power input connection;
a power output connection;
a power conditioner module;
a power monitoring module; and
a wireless communication module;
wherein said power monitoring module comprises one or more sensors;
wherein said one or more sensors are configured to generate one or more sensor data based on one or more power conditions of said power monitoring and reporting device;
wherein said power monitoring module is configured to receive said one or more sensor data;
wherein said power monitoring module is configured to transmit said sensor data to said wireless communication module; and
wherein said wireless communication module is configured to transmit said sensor data to a user device;
wherein said power monitoring module is adapted to receive a plurality of information that is gathered by said one or more sensors;
wherein said power monitoring module is further adapted to generate power data based on said plurality of information and send said power data to said wireless communication module;
wherein said wireless communication module is configured to transmit said power data to a user device;
wherein said plurality of information comprises a history of power conditions that is stored on said user device;
wherein said history of power conditions comprises a location, such that said plurality of information is compiled to create a database that identifies a type of power offered by said location.

11. The recreational vehicle power monitoring and reporting device of claim 10 wherein said wireless communication module is configured to receive instructions from said user device.

12. The recreational vehicle power monitoring and reporting device of claim 10 wherein said power conditions comprise conditions selected from the group of conditions consisting of volts, amperes, and watts.

13. The recreational vehicle power monitoring and reporting device of claim 10 wherein said sensor data is associated with at least one of a time and a location.

14. The recreational vehicle power monitoring and reporting device of claim 10 wherein said power data comprises one or more of voltage measurements, current measurements, power measurements, and energy measurements.

15. The recreational vehicle power monitoring and reporting device of claim 11 wherein said user device is configured to receive an input from a user relating to said recreation vehicle power monitoring and reporting device.

16. The recreational vehicle power monitoring and reporting device of claim 15 wherein said input comprises a command configured to affect operation of said recreational vehicle power monitoring and reporting device.

17. The recreational vehicle power monitoring and reporting device of claim 15 wherein said input comprises an inquiry related to said sensor data.

18. The recreational vehicle power monitoring and reporting device of claim 17 wherein said user device displays to said user information relating to said sensor data.

* * * * *